(12) United States Patent
Toffolo et al.

(10) Patent No.: US 6,542,146 B1
(45) Date of Patent: Apr. 1, 2003

(54) TRANSPARENT ELECTROLUMINESCENT DISPLAY WITH MECHANICAL GAUGE

(75) Inventors: Daniel J. Toffolo, Trumbull, CT (US); Silviu Pala, Birmingham, MI (US); Richard Chutorash, Rochester Hills, MI (US); Robert M. Roza, Farmington Hills, MI (US); Marian O. Borzea, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/320,884

(22) Filed: May 27, 1999

(51) Int. Cl.[7] .................................................. G09G 5/00
(52) U.S. Cl. ...................... 345/156; 345/636; 340/438; 340/441
(58) Field of Search ................................ 345/636, 156; 340/971, 972, 973, 438, 439, 440, 441

(56) References Cited

U.S. PATENT DOCUMENTS

| | | | | |
|---|---|---|---|---|
| 4,972,122 A | * | 11/1990 | Daidouji et al. ............ 315/106 |
| 5,764,139 A | * | 6/1998 | Nojima et al. .............. 340/461 |
| 5,995,001 A | * | 11/1999 | Wellman et al. ............ 340/438 |
| 6,137,399 A | * | 10/2000 | Westberg et al. ........... 340/441 |
| 6,157,294 A | * | 12/2000 | Urai et al. .................. 340/436 |
| 6,157,297 A | * | 12/2000 | Nakai ......................... 340/461 |
| 6,181,301 B1 | * | 1/2001 | Inoguchi et al. .............. 345/5 |

* cited by examiner

Primary Examiner—Richard Hjerpe
Assistant Examiner—Kimnhung Nguyen
(74) Attorney, Agent, or Firm—MacMillan, Sobanski & Todd, LLC

(57) ABSTRACT

A transparent display screen can be positioned in a driver's line of sight or in front of mechanical indicators on an instrument panel. The display screen preferably has a frame or rim member along only one edge of the screen. Since the display screen is transparent and does not include a frame or rim around its perimeter, the display screen makes information available without obstructing the driver's view of the road. The single frame or rim member supports all of the row and column electrodes that are used to selectively illuminate the pixels on the display screen. The transparent display screen can be used effectively with one or more mechanical indicators positioned properly near the display screen. In one example, a single controller controls the screen, an associated filter and the mechanical indicators.

19 Claims, 4 Drawing Sheets

TRANSPARENT ELECTROLUMINESCENT DISPLAY WITH MECHANICAL GAUGE

BACKGROUND OF THE INVENTION

This invention generally relates to a display system for use in a vehicle and, more particularly, to a transparent display screen that is used in combination with at least one mechanical gauge indicator element that is positioned near the display screen.

A variety of display systems are available for use in vehicles. With the increasing number of electrical subsystems within a vehicle and the increasing number of features provided to a driver, it is necessary and useful to provide more information to a driver. Conventional instrument panels typically do not have sufficient room to display all of the information that could be useful to a driver. Moreover, with improvements in technology, it is possible and desirable to provide a variety of information to a driver in a variety of formats. Conventional instrument panels are not capable of meeting this need.

A variety of display screens have been suggested for use in vehicles to provide additional types of information to the driver. A major drawback associated with each of the previously proposed systems is that it must be mounted in a position on the instrument panel or dashboard of the vehicle, where space is limited. Further, it is a challenge to provide a display panel in a position where it is easily observed by a driver without unnecessarily or undesirably distracting the river from the task of watching the road.

One attempted solution has been to substitute reconfigurable displays that display a graphic representation of the traditional gauge for the mechanical indicator. The reconfigurable displays permit the user to select different gauges to be displayed (i.e., speed, battery, oil pressure) or to change the units of measure (i.e., MPH to KPH). Such systems typically require expensive, very high resolution displays or the graphic representation of the indicator needle is unsatisfactory. Another shortcoming of such systems is that when the graphic representation of the needle is displayed other than purely horizontal or vertical, the needle appears jagged. Further, movement of the graphic needle, which must move at least one pixel at a time, does not have the smooth, continuous movement of a traditional mechanical indicator needle.

This invention provides a display system having a uniquely designed display panel that enables a driver to have access to a variety of visible information. This invention provides the advantage of enabling a single mechanical indicator to function as part of a variety of gauges. Further, this invention provides a display system that places the visible information within the typical or normal line of sight of a driver without obstructing the driver's view of the road.

SUMMARY OF THE INVENTION

In general terms, this invention is a display system for a vehicle having a transparent display screen that can be positioned directly in front of mechanical gauge indicator components. The display screen preferably is transparent and only has a frame or rim along one edge of the screen so that it does not obstruct the driver's view of the instrument panel.

A display system designed according to this invention includes several basic components. A display panel includes at least one reconfigurable portion. A panel frame extends along only one side of the panel. A plurality of row and column electrodes are supported by the panel rim and extend from the rim into the display panel to provide illumination to the pixels on the display screen to produce a desired display or image on the screen. The display screen can be positioned in front of mechanical gauge indicator components such as needles. The displayed images on the screen are varied depending on the information desired by a driver of the vehicle. The mechanical indicator components are controlled to work consistent with any one of a number of displays on the display screen so that the desired information is available to a viewer of the display panel.

Various features and advantages of this invention will become apparent to those skilled in the art from the following detailed description of the presently preferred embodiment. The drawings that accompany the detailed description can be briefly described as follows.

DETAILED DESCRIPTION OF THE PREFERRED EMBODIMENT

Figure 1:
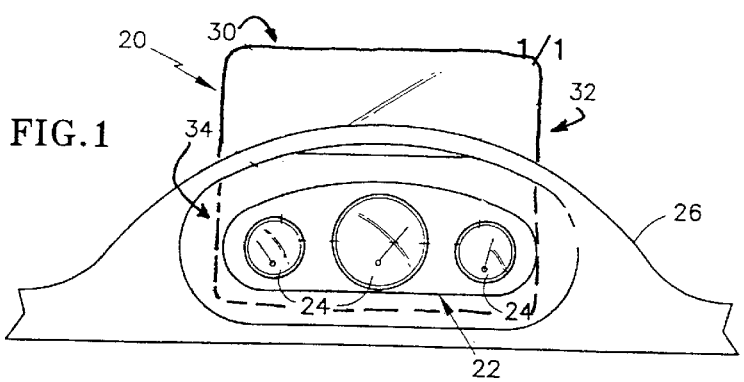
FIG. 1 is a schematic, diagrammatic illustration of a display system designed according to this invention.

FIG. 1 diagrammatically and schematically shows a display system 20 for use in a vehicle. The display system 20 includes an instrument panel 22 that includes a plurality of gauges 24, such as a speedometer, tachometer and fuel gauge, for example. The instrument panel 22 is supported on a dashboard or instrument panel frame 26 in a conventional manner.

Figure 2:
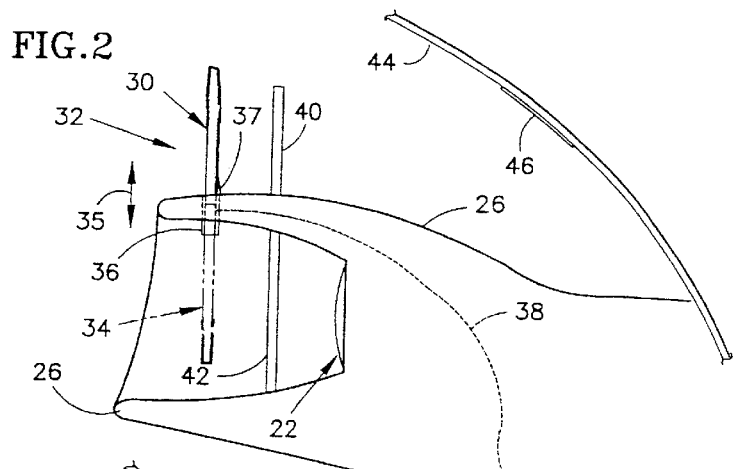
FIG. 2 is a side view of a first embodiment of this invention.
Figure 3:
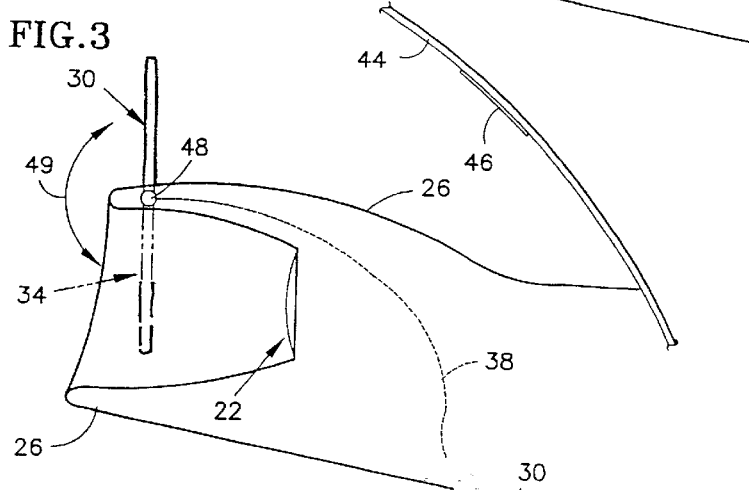
FIG. 3 is a side view of a second embodiment of this invention.

A display screen 30 preferably is supported on the instrument panel frame 26 so that it is moveable between a first position 32 and a second position 34 (shown in phantom). As can be seen in FIGS. 1 through 3, the first position 32 includes the display screen 30 being positioned above the instrument panel 22 and above the dashboard 26. In this first position, the display screen 30 is within the normal line of sight or view of a driver of the vehicle.

The display screen 30 preferably is transparent and electroluminescent so that it does not obstruct the ability for the driver to observe the road while driving. The display screen 30 most preferably does not include a frame or rim around its perimeter because such a frame or rim may obstruct the view of the driver or distract the driver while the display screen 30 is in the first position 32.

Referring to FIG. 2, a first embodiment of the display system 20 is illustrated in slightly more detail in a diagrammatic fashion. The display screen 30 is moveable between the first position 32 and the second position 34 as illustrated by the arrow 35. A support member 36, which preferably is a sliding channel, supports the display screen in a manner that allows it to be manually moved between the first and second positions 32 and 34. The preferred embodiment includes a cover 37 that is moveable into a position where it closes a gap at the top of the instrument panel frame 26 whenever the display screen 30 is moved into the second position 34. A power and data supply cord 38 preferably is relatively flexible and extendable through the instrument panel frame 26 so that it accommodates the movement of the display screen 30 between the two positions.

The preferred embodiment also includes a filter 40 and a filter 42 that are positioned behind the display screen 30 (relative to the driver). The filter 40 enhances the viewability of any display or image on the display screen 30 by filtering out some light such as sunlight or the light from oncoming headlights that comes through the windshield 44 of the vehicle. Similarly, the filter 42 filters out light coming from the instrument panel 22, which makes the display more effective when the display screen 30 is in the second position 34. A single filter can be used that moves with the screen 30. Further, a polarizer 46 preferably is mounted on the windshield 44 to provide additional filtering of light to make the images on the display screen 30 more readily visible. In one example, the polarizer 46 has a first orientation and the filter 40 is a polarizer having a second orientation that is rotated 90° relative to the first orientation. Alternatively, a filter can be designed to have a variable transmission as described below.

FIG. 3 shows another embodiment where the display screen 30 is pivotably supported on the dashboard or instrument panel frame 26 by a pivoting support member 48. In this embodiment, the display screen 30 can be flipped from the first position 32 to the second position 34 as generally shown by the arrow 49. Although not specifically illustrated, this embodiment preferably includes a position detector that determines the screen position so that the data supplied will result in a display that is oriented consistent with the screen position. In other words, the display image will need to be flipped whenever the screen is flipped so that the displayed image is not upside down. The display screen 30 does not obstruct the view of the driver through the windshield 44 or the view of the instrument panel 22 under normal operating conditions because the display screen 30 preferably is transparent and does not have a frame or rim around the edges that extend outward and away from the instrument panel frame 26.

Figure 4:
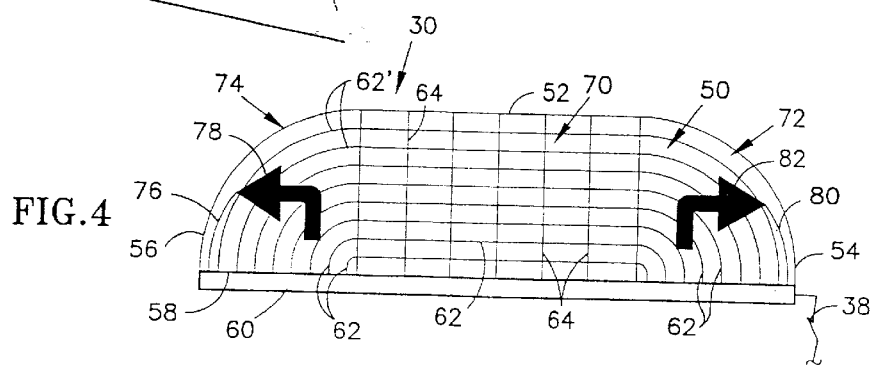
FIG. 4 is a schematic diagram of a display screen designed according to this invention.

FIG. 4 schematically illustrates the preferred embodiment of the display screen in more detail. The display screen 30 preferably includes a transparent display panel 50 having a top edge 52 and side edges 54 and 56. Only the bottom edge 58 includes a frame or rim portion 60. The edges 52, 54 and 56 do not have a frame or rim extending around them, which enhances the ability for the driver to maintain a normal line of sight through the windshield 44 without unnecessary obstruction. All of the power and data for the display panel 50 is supplied through the power supply line 38 (which is connected to a power and data source that is not illustrated). The electrical connection 38 is maintained through the single rim member 60.

A plurality of row electrodes extend from one side of the rim member 60 and then across a central portion of the display panel 50 and then terminate back at the rim member 60. A plurality of column electrodes 64 extend generally perpendicularly away from the edge 58 of the display screen 50. All of the power and data is supplied for the entire display screen from the one side of the display. The row electrodes 62 and column electrodes 64 interact within the central portion 70 of the display 50 to provide a first, reconfigurable display portion. The row electrodes 62 and column electrodes 64 operate in a conventional manner to illuminate selected pixels within the first portion 70 to provide display images as desired.

The display screen 50 also includes non-reconfigurable portions 72 and 74. These portions have the row electrodes 62 extending through them. The row electrodes 62 preferably extend through the portions 72 and 74 in a generally arcuate pattern as illustrated. The preferred embodiment includes at least some of the row electrodes 62 having a varying thickness along a portion of their length. Since the length of each of the traces that constitute the row electrodes 62 is proportional to the resistance associated with each row electrode, the preferred embodiment modifies th e thickness of some of the row electrodes to maintain a more consistent resistance across the entire display panel 50. For example, the row electrodes 62' have a length that is much longer than the row electrodes 62 that extend across the reconfigurable portions 70 closer to the edge 58 of the display 50. The portions of the row electrodes 62' that extend through the screen portions 72 and 74 preferably have a greater thickness than the portions of the same row electrodes extending through the reconfigurable portion 70. Further, the thickness of the row electrodes 62' within the portions 72 and 74 are greater than the thicknesses of the row electrodes 62 that extend along the portions 72 and 74 but have a relatively shorter length. The thicker portions of the longer row electrodes reduces the resistance associated with those row electrodes and maintains a more consistent resistance across the entire display panel. The thickness can be increased in one or more directions (i.e., parallel with the screen or perpendicular to the screen).

The most preferred embodiment includes an icon electrode 76 that extends out of the frame member 60 for selectively illuminating an icon 78 with in the portion 74. The icon 78 is formed by shaping the electrode 76 and can be, for example, a turn signal indicator. Similarly, the portion 72 of the screen 50 preferably includes an icon electrode 80 for selectively illuminating an icon 82. Since the portions of the screen 72 and 74 are not reconfigurable, one or more icons can conveniently be provided on those portions to provide additional information to the electrode through the display 30. The information to be supplied on the reconfigurable portion 70 and the form of the icons 78 and 82 can vary depending upon the needs of a particular embodiment.

A significant advantage is provided by the inventive arrangement because the display screen 50 has a frame or rim member 60 along only one edge 58 of the display 30. Therefore, a transparent display screen 50 can be placed above the instrument panel without obstructing a driver's normal view of the road. Additionally, the transparent display screen allows a driver to see mechanical indicators on the instrument panel even when the display screen 30 is positioned in front of the instrument panel 22 (i.e., in the driver's line of sight of the panel 22). This arrangement allows for additional information to be provided to a driver in an effective and convenient manner within the already limited space within the interior of a vehicle.

Figure 5:
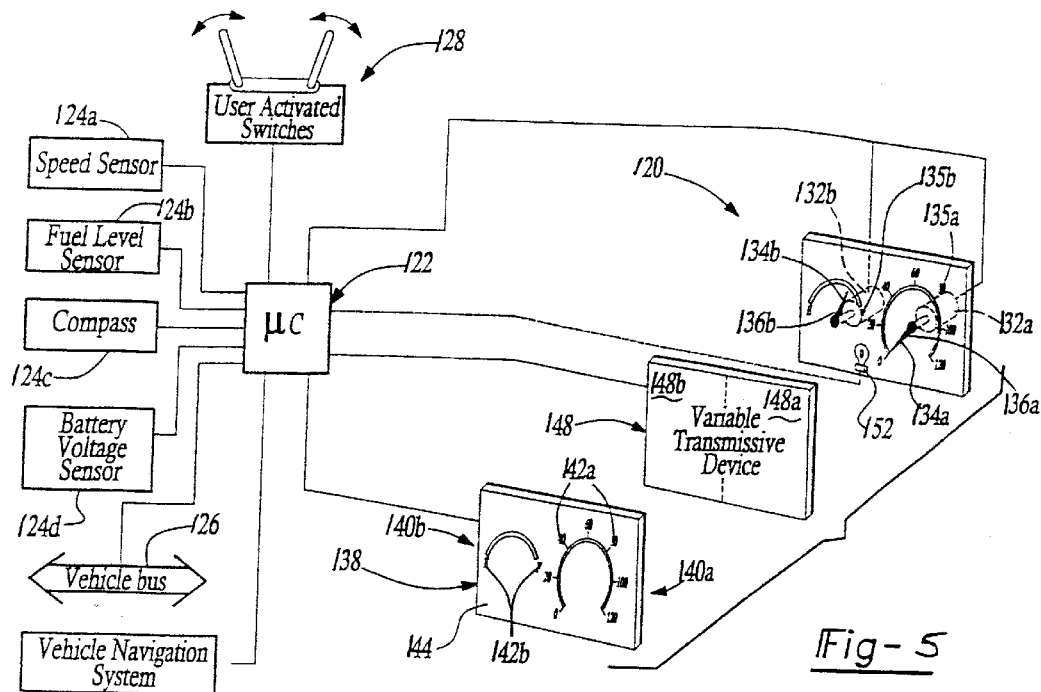
FIG. 5 is a schematic illustration of a system including a display designed according to this invention.

A system 120 that combines displayed images with mechanical gauge indicators is shown in FIG. 5. A controller 122 receives data from a plurality of sensors 124 mounted on the vehicle, such as a vehicle speed sensor 124a, fuel level sensor 124b, a compass 124c, and a battery voltage sensor 124d. The controller 122 preferably also receives additional vehicle information from a vehicle bus 126, and a vehicle navigation system 127. One or more user activated switches 128 or other interface components permit the user to select which sensor data will be displayed. The controller 122 may be a microprocessor or logic circuit, for example.

The controller 122 controls a motor 132a to move a mechanical indicator 134a, such as a needle. Preferably a digitally controlled motor 132a, such as a stepper motor, is utilized. Alternatively, a servo motor or other known means for moving an indicator 134 could be used. Non-reconfigurable, light-emitting backup gauge displays 135a, such as LEDs, indicate miles-per-hour about the periphery of the indicator 134a travel. One or more LEDs 136a or other light sources may optionally be mounted on the indicator 134a. Alternatively, the LEDs 136a or light sources may be adjacent the indicator 134a.

A display 138, preferably a transparent electroluminescent display such as the display 30 described above, is positioned in front of the indicator 134a. The display 138 selectively displays, among other things, one of a plurality of gauge displays 140a, such as miles-per-hour 140a, having indicia 142a. The display 138 is viewed by the user from a front 144 of the display 138. The display 138 is preferably mounted in front of the indicator 134a (i.e., between the indicator and the driver).

A variable transmissive device 148 is preferably disposed between the display 138 and the indicator 134. The variable transmissive device 148 preferably comprises an electrochromic dimmer or LCD, such as is known in the art. The variable transmissive device 148 preferably provides transmissivity variable between approximately 0.85 and 0.05. Alternatively, the variable transmissive device 148 can comprise a shear material which may be illuminated by a light source 152 behind the transmissive device 148. Selective operation of the light source 152 by the controller 122 behind the transmissive device 148 selectively hides or makes visible the indicator 134 from the front of the display 138.

Preferably a second mechanical indicator 134b is positioned adjacent the mechanical indicator 134a. The display 138 further displays a gauge display 140b corresponding to input from the fuel-level sensor 124b. The controller 122 controls the motor 132b to move indicator 134b based upon data from another sensor, such as the fuel-level sensor 124b, or whichever sensor 124 is associated with a current gauge display 140. Non-reconfigurable, light-emitting backup gauge displays 135b, such as LEDs, indicate fuel levels about the periphery of the indicator 134b travel. The indicator 134b may include one or more LED's 136b or other light sources. Alternatively, the LEDs 136b or light sources may be adjacent the indicator 134b. Preferably, the variable transmissive device 148 is partitioned such that the transmissivity of a right portion 138a is variable independently of a left portion 138b.

In operation, the display 138 displays each gauge display 140 corresponding to one of the vehicle sensors 124, and the associated indicator 134 is moved based upon data received from the sensor 124 corresponding to the gauge display 140. The controller 122 controls the motor 132 to move the indicator 134 rotatably to point to the appropriate indicia 142 in the gauge display 140 based upon data from the sensor 124. The visibility of the indicator 134 through the variable transmissive medium 148 and display 138 is increased by the LED's 136 on the indicator 136, particularly at night. When selected by a user activated switch 128 or when determined appropriate by the controller 122, the controller 122 changes the display 138 to indicate different gauge displays 140. At the same time, the controller 122 modifies the position of the associated indicator 134.

Figure 6:
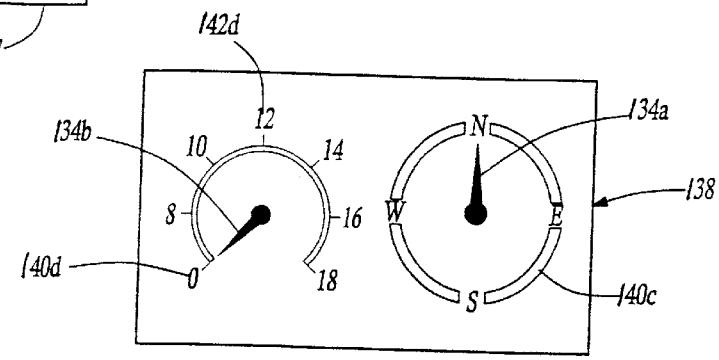
FIG. 6 is a front view of one configuration of the display and indicators of FIG. 5.

For example, when selected by a user activated switch 128 or when determined to be appropriate by the controller 122, the controller 122 changes the display 138 to indicate the compass 140c as shown in FIG. 6. At the same time, the controller 122 modifies the position of the indicator 134a to indicate the direction of vehicle travel based upon data from the compass 124c. The controller 122 may also change the gauge display 140b on display 138 to the gauge display 140d for battery voltage. At the same time, the controller 122 moves the indicator 134b to reflect data received from a battery voltage sensor 124d. The gauge then displays battery voltage utilizing the reconfigurable display 138 and indicator 134b.

Figure 7:
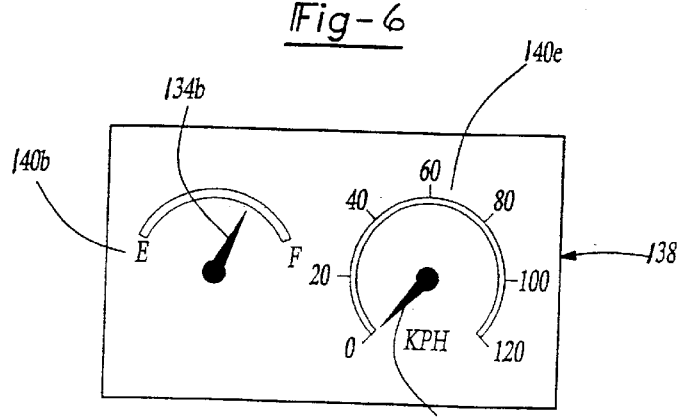
FIG. 7 illustrates another configuration of the display and indicators of FIG. 5.

Upon selection by a user activated switch 128 or when determined to be appropriate by the controller 122, the controller changes the display 138 to display a gauge display 140e for kilometers per hour as shown in FIG. 7. At the same time, the controller 122 changes the position of the indicator 134 to indicate the current speed of the vehicle in kilometers per hour in conjunction with the gauge display 140e.

Figure 8:
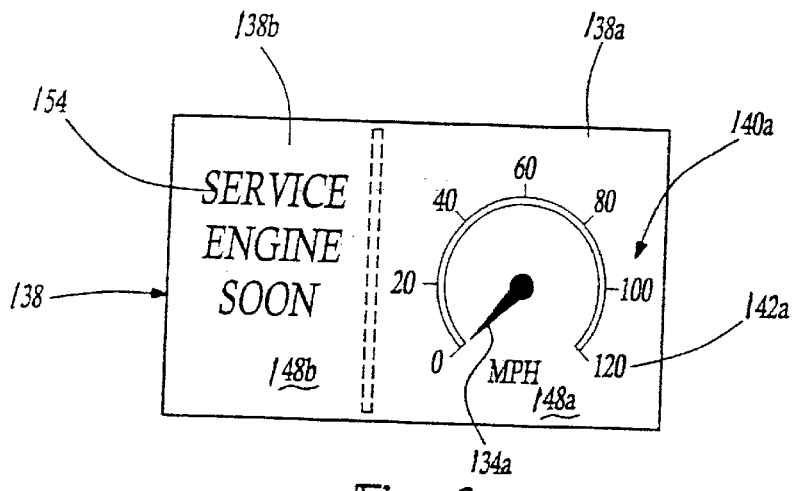
FIG. 8 illustrates another configuration of the display and indicators of FIG. 5.

As shown in FIG. 8, the left portion 148b of the variable transmissive device 148 can be selected to become opaque by the controller 122 or manually via switches 128. Information 154 can then be displayed by display 138 on the left portion 138b of the display independent of the indicator 134b. It should be apparent the right portion 148a of the variable transmissive device could also be made opaque to display information on the right portion 138a of the display 138 independent of the indicator 134a.

Figure 9:
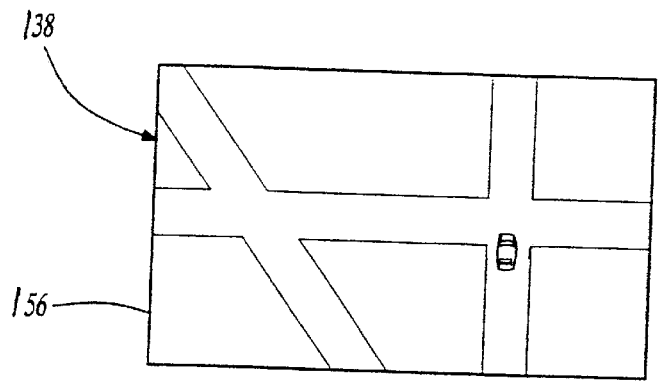
FIG. 9 illustrates another configuration of the display of FIG. 5.

As shown in FIG. 9, when selected by a user activated switch 128 or when determined to be appropriate by the controller 122, the entire variable transmissive device 148 becomes relatively opaque based upon a signal from the controller 122, thereby hiding the indicators 134a–b. The display 138 can display information 156 based upon data from the navigation system 127, such as a map and the location of the vehicle, on the display 138 without the indicator 134 being visible. It should be apparent that the display 138 can then be used to display any information, such as text or other graphics, when the indicator 134 is obscured by the variable transmissive device 148.

Figure 10:
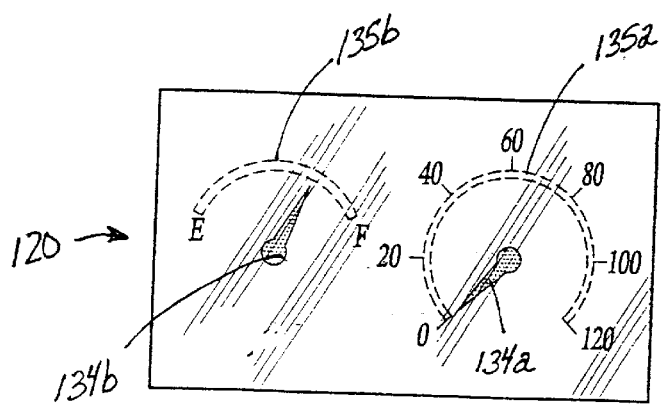
FIG. 10 illustrates another mode of operation of the arrangement of FIG. 5.

Referring to FIG. 10, if the electroluminescent display 138 should fail during operation, the controller 122 takes several steps automatically or by manual selection with switches 128. First the variable transmissive device 148 becomes transparent. The backup gauge displays 135a–b are turned on to provide a backup gauge display, so that the gauge 120 can provide fuel level and speed information at all times, even if the display 138 should fail. Light from the backup gauge displays 135a–b is visible through front surface 144.

It should be apparent that any number of mechanical indicators 134 could be positioned adjacent the display 138 and that more than one display 138 could also be utilized. The variable transmissive medium 148 could be partitioned for each indicator 134, so that any indicator 134 could be selectively obscured.

Figure 11:
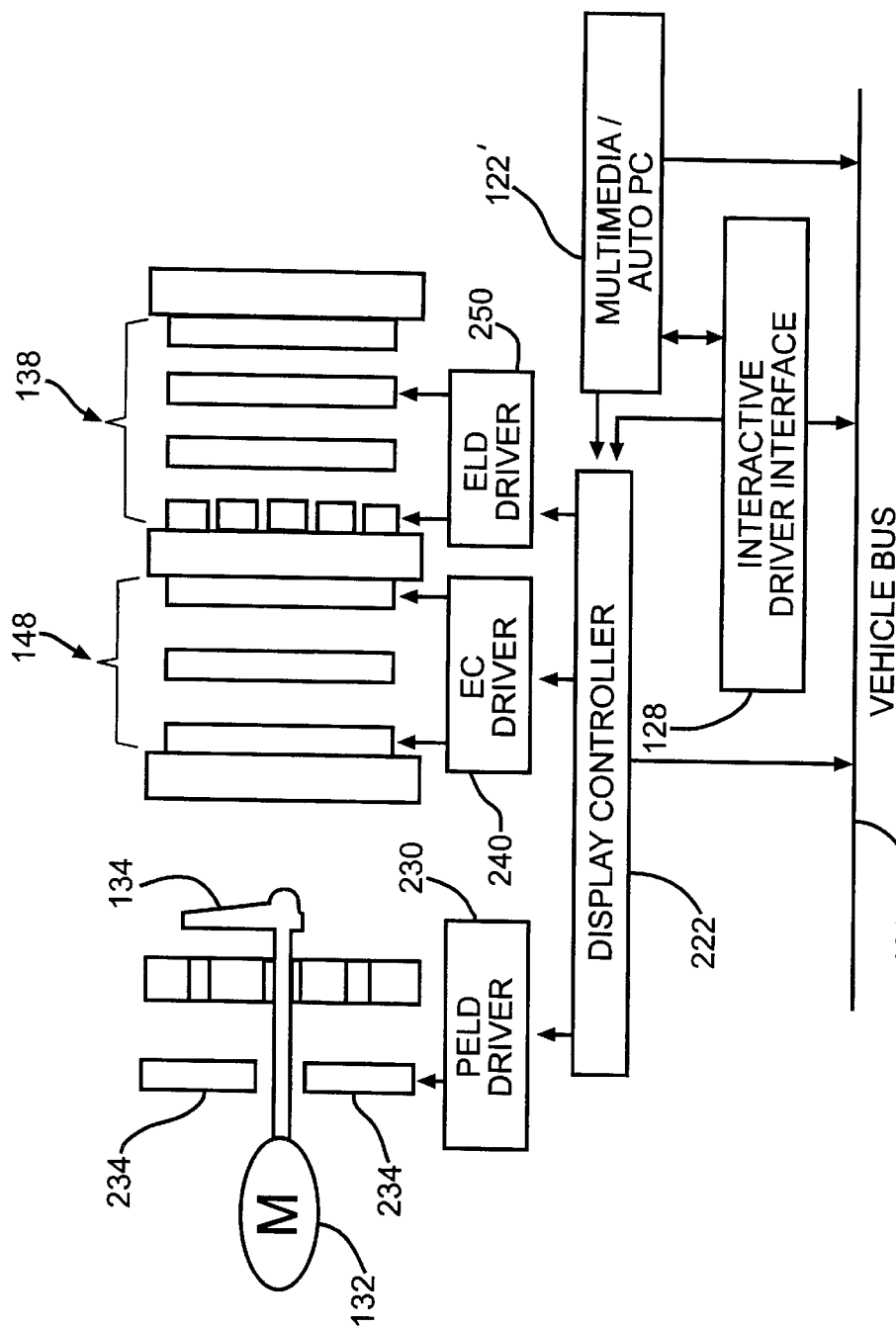
FIG. 11 illustrates a preferred arrangement for controlling a system designed according to this invention.

FIG. 11 schematically illustrates a preferred arrangement for controlling the display system. This example is modified compared to those discussed above in that the controller 122' is effectively separated into two separate modules. A first module 122' processes information from the vehicle bus 126 and the interactive driver interface 128. The controller module 122' communicates with a display controller 222 which also communicates with the driver interface 128. The display controller 222 also provides information to other portions of the vehicle through the vehicle bus 126.

The display controller 222 controls a backlight driver 230 to selectively cause illumination of backlight elements 234, which can be light emitting diodes or other icon lighting elements as known in the art. The display controller 222 also controls a filter driver 240, which controls the transmissivity of the controllable filter 148. The display controller 222 also controls the display screen 138 through the ELD driver 250. In this embodiment, a single, dedicated display controller module 222 is responsible for the operation of the display screen 138, the transmissivity of the controllable filter 148 and the operation of the mechanical indicator 134.

The preceding description is exemplary rather than limiting in nature. Variations and modifications may become apparent to those skilled in the art that do not depart from the purview and spirit of this invention. The legal scope of protection given to this invention is to be limited only by the following claims.

What is claimed is:

1. A display system comprising:
   a panel having at least one reconfigurable portion;
   a panel frame extending along only one side of said panel;
   a plurality of row electrodes and a plurality of column electrodes supported by said panel frame and extending from said frame into said reconfigurable panel portion;
   at least one mechanical indicator component positioned near said panel; and
   a controller that controls said row and column electrodes to selectively generate a displayed image on said panel and controls said indicator component such that said indicator component and said displayed image provide desired information to a viewer of said panel,
   wherein said panel is supported such that said panel is moveable between a first position where said indicator components are behind said panel and a second position.

2. The system of claim 1, wherein said panel is transparent.

3. The system of claim 1, including a filter positioned between said indicator component and said display panel.

4. The system of claim 3, wherein said filter is controlled to selectively allow said indicator component to be visible in combination with a displayed image on said panel.

5. The system of claim 3, wherein said filter prevents light from behind said display panel from interfering with the viewer's ability to perceive a displayed image on the display panel.

6. The system of claim 3, wherein said filter comprises a variable transmissive device.

7. The system of claim 1, wherein said row electrodes extend along said reconfigurable panel portion in a generally straight line in a first direction and said column electrodes extend along said reconfigurable panel portion in a generally straight line in a second direction that is generally perpendicular to said first direction.

8. The system of claim 1, including at least one panel portion that is not reconfigurable and wherein said second panel portion includes at least one icon that is selectively illuminated.

9. The system of claim 1, including gauge display elements positioned near said indicator components, said gauge display elements being selectively energized to provide a gauge display with said indicator components when said panel is in said second position.

10. The system of claim 1, wherein the mechanical indicator includes illumination and the controller controls the illumination.

11. A display system for a vehicle comprising:
    at least one mechanical indicator component that is controllable to move into at least two positions, said indicator component being positioned in the vehicle so as to be visible to a driver of the vehicle; and
    a transparent display panel positioned near said indicator component and that is controllable to selectively display an image on said panel,
    wherein said panel is movable between a first position at which said image and said indicator component are viewable in superposition by the driver to provide a visible indication of desired information and a second position spaced from said first position within a normal line of sight of the driver.

12. The system of claim 11, wherein said indicator component comprises a needle that is rotatable into a plurality of positions.

13. The system of claim 11, wherein said indicator component provides a second visible indication of desired information different from the first-mentioned indication when said panel is at said second position.

14. The system of claim 11, wherein said panel includes a frame portion along only one side of said panel, said frame portion being out of the normal line of sight of the driver when said panel is at said second position, and wherein a plurality of column electrodes and a plurality of row electrodes are supported by said frame portion and extend into said panel.

15. A display system comprising:
- a display panel having a perimeter and that is controllable to selectively display a visible image on said panel;
- a frame along only a portion of said panel perimeter such that another portion of said panel has an edge that is not framed, said frame having a frame portion running along a single edge of said panel perimeter;
- a first plurality of electrodes having respective first and second ends and extending along at least a reconfigurable portion of said panel, said first ends of said first plurality of electrodes being supported by said frame portion; and
- a second plurality of electrodes having respective first and second ends and extending along at least said reconfigurable portion of said panel, said first ends of said second plurality of electrodes being supported by said frame portion, said first and second pluralities of electrodes forming a grid on said reconfigurable portion of said panel such that said first and second pluralities of electrodes are controlled to provide the visible image.

16. The system of claim 15, wherein said first plurality of electrodes also extend along a second portion of said panel that is not reconfigurable.

17. The system of claim 16, wherein said second portion of said panel includes at least one icon electrode that is configured as an icon and is selectively controlled to provide a visible image of the icon.

18. The system of claim 15, further including at least one mechanical indicator component behind said panel, said indicator component being selectively movable relative to said panel to provide a visible indication of desired information to a view of the displayed image and said indicator component.

19. The system of claim 15, wherein said second ends of said first plurality of electrodes are also supported by said frame portion.

* * * * *